(12) United States Patent  (10) Patent No.: US 9,128,696 B1
Maslennikov et al.  (45) Date of Patent: Sep. 8, 2015

(54) METHOD AND SYSTEM FOR GENERATING SCRIPT FOR A VIRTUAL CONNECT CONFIGURATION OF A BLADE ENCLOSURE

(71) Applicant: MAGIC FLEX LTD., Ganei Tikva (IL)

(72) Inventors: Alexey Maslennikov, Modi'in (IL); Shalom Ramadi, Kiryat Ono (IL)

(73) Assignee: MAGIC FLEX LTD., Ganei Tikva (IL)

( * ) Notice: Subject to any disclaimer, the term of this patent is extended or adjusted under 35 U.S.C. 154(b) by 0 days.

(21) Appl. No.: 14/450,341

(22) Filed: Aug. 4, 2014

(51) Int. Cl.
*G06F 9/44* (2006.01)

(52) U.S. Cl.
CPC ........................................ *G06F 8/30* (2013.01)

(58) Field of Classification Search
CPC ........................................................ G06F 8/30
USPC .................................................. 717/106–123
See application file for complete search history.

(56) References Cited

U.S. PATENT DOCUMENTS

| | | | |
|---|---|---|---|
| 2003/0121024 A1* | 6/2003 | Hill et al. | 717/107 |
| 2006/0036715 A1* | 2/2006 | Ghattu | 709/220 |
| 2006/0242396 A1* | 10/2006 | Cartes et al. | 713/1 |
| 2007/0294669 A1* | 12/2007 | Robalewski et al. | 717/120 |
| 2013/0332901 A1* | 12/2013 | Berg et al. | 717/121 |

OTHER PUBLICATIONS

Pruett, G. R. E. G., et al. "BladeCenter systems management software." IBM journal of research and development 49.6 (2005), pp. 963-975.*

Das, Rajarshi, et al. "Autonomic multi-agent management of power and performance in data centers." Proceedings of the 7th international joint conference on Autonomous agents and multiagent systems: industrial track. International Foundation for Autonomous Agents and Multiagent Systems, 2008, pp. 107-114.*

Blades, Hetty. "Creative computing and the re-configuration of dance ontology." Proceedings of Electronic Visualisation in the Arts (EVA 2012) (2012), pp. 221-228.*

* cited by examiner

*Primary Examiner* — Satish Rampuria
(74) *Attorney, Agent, or Firm* — Pearl Cohen Zedek Latzer Baratz LLP

(57) ABSTRACT

A system and method for generating command scripts for profile configurations of an Hewlett Packard Virtual Connect Blade enclosure, by parsing a show-all report of the domain, generating a configuration script that includes configuration statements for static entities of the domain; and generating a configuration script that includes configuration statements for dynamic entities of the domain.

6 Claims, 5 Drawing Sheets

```
->show all *
 BANNER INFORMATION
There is no banner text configured
 DEVICEBAY INFORMATION
****************************************************************
*******
ID            : enc0:1
Enclosure Name : Enclosure1
Bay           : 1
Device        : HP ProLiant BL420c Gen8
Profile       : Profile_1
---------------------------------------
ID            : enc0:2
Enclosure Name : Enclosure1
Bay           : 2
Device        : HP ProLiant BL460c Gen8
Profile       : <Unassigned>
---------------------------------------
ID            : enc0:3
Enclosure Name : Enclosure1
Bay           : 3
Device        : HP ProLiant BL490c G7
Profile       : Profile_3
---------------------------------------
ID            : enc0:4
Enclosure Name : Enclosure1
Bay           : 4
Device        : HP ProLiant BL465c Gen8
Profile       : <Unassigned>
---------------------------------------
ID            : enc0:5
Enclosure Name : Enclosure1
Bay           : 5
Device        : HP Proliant BL685c G7
Profile       : <Unassigned>
---------------------------------------
ID            : enc0:6
Enclosure Name : Enclosure1
Bay           : 6
Device        : HP Proliant BL620c G7
Profile       : <Unassigned>
---------------------------------------
ID            : enc0:7
Enclosure Name : Enclosure1
Bay           : 7
Device        : <Covered>
Profile       : <Unassigned>
---------------------------------------
ID            : enc0:8
Enclosure Name : Enclosure1
Bay           : 8
Device        : HP Proliant BL680c G7
Profile       : <Unassigned>
---------------------------------------
ID            : enc0:9
Enclosure Name : Enclosure1
Bay           : 9
Device        : HP ProLiant BL420c Gen8
Profile       : <Unassigned>
---------------------------------------
```

Fig. 1

```
set domain Name=SampleVcDomain set snmp enet ReadCommunity=public
set snmp fc ReadCommunity=public set ssl Strength=Strong
set user-security StrongPasswords=Disabled MinPasswordLength=8
set ldap Enabled=false set local-users Enabled=true PrimaryRemoteAuthenticationMethod=none set tacacs Enabled=false Port=49 Timeout=10 SecondaryPort=49 SecondaryTimeout=10
LoggingEnabled=false set radius Enabled=false Port=1812 Timeout=10 SecondaryPort=1812 SecondaryTimeout=10 set role domain Order=local,ldap,radius,tacacs
set role network Order=tacacs,radius,local
set role server Order=ldap,local
set role storage Order=radius,local set mac-cache Enabled=true Refresh=5
set igmp Enabled=false
set enet-vlan -quiet VlanCapacity=Expanded
set statistics-throughput Enabled=true SampleRate=5m
set loop-protect Enabled=true add network Net1 -quiet NAGs=Default VLanTunnel=Disabled
add uplinkport enc0:1:X1 Network=Net1 Speed=Auto
add uplinkport enc0:2:X1 Network=Net1 Speed=Auto set advanced-networking -quiet PacketBufferOverallocationRatio=1 FlowControl=auto set link-dist-interval Interval=30 add fabric Fab1 Type=FabricAttach Bay=3 Ports=1,2 Speed=Auto LinkDist=Manual
add fabric Fab2 Type=FabricAttach Bay=4 Ports=1,2 Speed=Auto LinkDist=Manual add profile Profile_1 -NoDefaultEnetConn -NoDefaultFcConn -NoDefaultFcoeConn NAG=Default
add enet-connection Profile_1 Network=Net1 PXE=UseBIOS
add enet-connection Profile_1 Network=Net1 PXE=UseBIOS
add fc-connection Profile_1 Fabric=Unassigned Speed=Auto
add fc-connection Profile_1 Fabric=Unassigned Speed=Auto
add fcoe-connection Profile_1 Fabric=Fab1 SpeedType=4Gb
add fcoe-connection Profile_1 Fabric=Fab2 SpeedType=4Gb
add profile Profile_3 -NoDefaultEnetConn -NoDefaultFcConn -NoDefaultFcoeConn NAG=Default
add enet-connection Profile_3 Network=Net1 PXE=UseBIOS
add enet-connection Profile_3 Network=Net1 PXE=UseBIOS
add fc-connection Profile_3 Fabric=Unassigned Speed=Auto
add fc-connection Profile_3 Fabric=Unassigned Speed=Auto
add fcoe-connection Profile_3 Fabric=Fab1 SpeedType=4Gb
add fcoe-connection Profile_3 Fabric=Fab2 SpeedType=4Gb add profile Dummy_1 -NoDefaultEnetConn -NoDefaultFcConn -NoDefaultFcoeConn NAG=Default
add enet-connection Dummy_1 Network=Net1 PXE=UseBIOS
add enet-connection Dummy_1 Network=Net1 PXE=UseBIOS
add fc-connection Dummy_1 Fabric=Unassigned Speed=Auto
add fc-connection Dummy_1 Fabric=Unassigned Speed=Auto
add fcoe-connection Dummy_1 Fabric=Fab1 SpeedType=4Gb
add fcoe-connection Dummy_1 Fabric=Fab2 SpeedType=4Gb assign profile Profile_1 enc0:1
assign profile Dummy_1 enc0:3
unassign Dummy_1
assign profile Profile_3 enc0:3
remove profile Dummy_1
```

METHOD AND SYSTEM FOR GENERATING SCRIPT FOR A VIRTUAL CONNECT CONFIGURATION OF A BLADE ENCLOSURE

FIELD OF THE DISCLOSURE

The present disclosure relates to Hewlett Packard (HP) Virtual Connect™ (VC) and HP Blade enclosures. More particularly, the present invention relates to a method and system for generating a VC configuration script of a blade enclosure.

BACKGROUND

Virtual machine technology is designed to move workloads across virtual machines on a single server. HP Virtual Connect (VC) technology facilitates virtualization in Blade server systems. Blades introduced a modern form of server technology having a more efficient design than conventional servers, cutting down on excess components that are usually found in servers and making room for the implementation of components aimed at specified needs. Blade servers facilitate an efficient use of physical space and energy.

Blades are ultra-high density components that can be used for a variety of services. Uses include servers, storage of data, and communication interfaces. Blades are installed (usually termed "racked") inside blade enclosures, which supply power, cooling and networking connections. HP Blade Systems greatly increased the speed of program execution and the capacity of data storage in a smaller space as compared to conventional server setups.

SUMMARY

Embodiments of the invention may include a method for generating a configuration script of an HP VC domain of a Blade System enclosure including obtaining via an input device a configuration report for an HP VC domain of a blade system enclosure using a "show all*" command; parsing the report; generating via an output device a first portion of the configuration script that includes configuration statements for static entities of the domain; and generating via the output device a second portion of the configuration script that includes configuration statements for dynamic entities of the domain.

In some embodiments generating the second portion may include generating a script with an unordered set of profile creation commands for actual profiles, and determining an order of original profiles based on information of MAC, WWN and S/N sequence. Generating the second portion may also include identifying one or more gaps of disorder in the MAC, WWN and/or S/N sequence; and generating one or more dummy or filler profiles to fill the gaps.

Embodiments of the invention may include, for one or more sequences, calling a 'reserve identifiers' procedure for one or more dummy profiles to fill one or more of the gaps preceding the sequence, and calling a 'reserve-identifiers' procedure for currently present profiles of that sequence.

Embodiments of the invention may include adding assignment statements in the script for the actual profiles.

Embodiments of the invention may include a non-transitory computer readable storage medium for restoring a configuration script of an HP VC domain of a Blade System enclosure, having stored thereon instructions that when executed by a processor will cause the processor to perform methods described herein, for example, to obtain via an input device a show-all report for an HP VC domain of a blade system enclosure using a show-all command; parse the show-all report; generate via an output device a first portion of the configuration script that includes configuration statements for static entities of the domain; and generate via the output device a second portion of the configuration script that includes configuration statements for dynamic entities of the domain.

Embodiments of the invention may include instructions that when executed by a processor will cause the processor further to generate a script with an unordered set of profile creation commands for actual profiles; determine an order of original profiles based on any MAC, WWN and S/N sequence; identify gaps relating to a disorder in the MAC, WWN and/or S/N sequence; and generate dummy or filler profiles to fill the gaps.

Embodiments of the invention may include instructions that when executed by a processor will cause the processor further to, for sequences, call or execute a reserve_identifiers procedure for dummy profiles to fill gaps preceding the sequence, and call a reserve_identifiers procedure for currently present profiles of that sequence.

Embodiments of the invention may include instructions that when executed by a processor will cause the processor further to add assignment statements in the script for the actual profiles.

Embodiments of the invention may include a configuration script of an HP VC domain of a Blade System enclosure, having a memory and a processing unit that is configured to obtain via an input device a show-all report for a HP VC domain of a blade system enclosure using a show-all command; parse the show-all report; generate via an output device a first portion of the configuration script that includes configuration statements for static entities of the domain; and generate via the output device a second portion of the configuration script that includes configuration statements for dynamic entities of the domain.

In embodiments of a system the processing unit is configured, when generating the second portion to generate a script with an unordered set of profile creation commands for actual profiles; determine an order of original profiles from information of a MAC, WWN or S/N sequence; identify gaps of a disorder in the MAC, WWN and/or S/N sequence; and generate dummy or filler profiles to fill the gaps.

In some embodiments, the processor may, for each sequence, call a 'reserve_identifiers' procedure for the dummy profiles to fill the gaps preceding the sequence, and call a 'reserve_identifiers' procedure for currently present profiles of that sequence. In some embodiments, the processor may, add assignment statements in the script for the actual profiles.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

FIG. 1 shows an excerpt from a "show all" report of an HP VC Blade System enclosure in accordance with the prior art;

FIG. 2 presents a configuration script generated by applying a method for restoring or generating a configuration script for that enclosure (enclosure 1), according to some embodiments of the present invention;

DETAILED DESCRIPTION OF EMBODIMENTS OF THE INVENTION

Figure 3A:
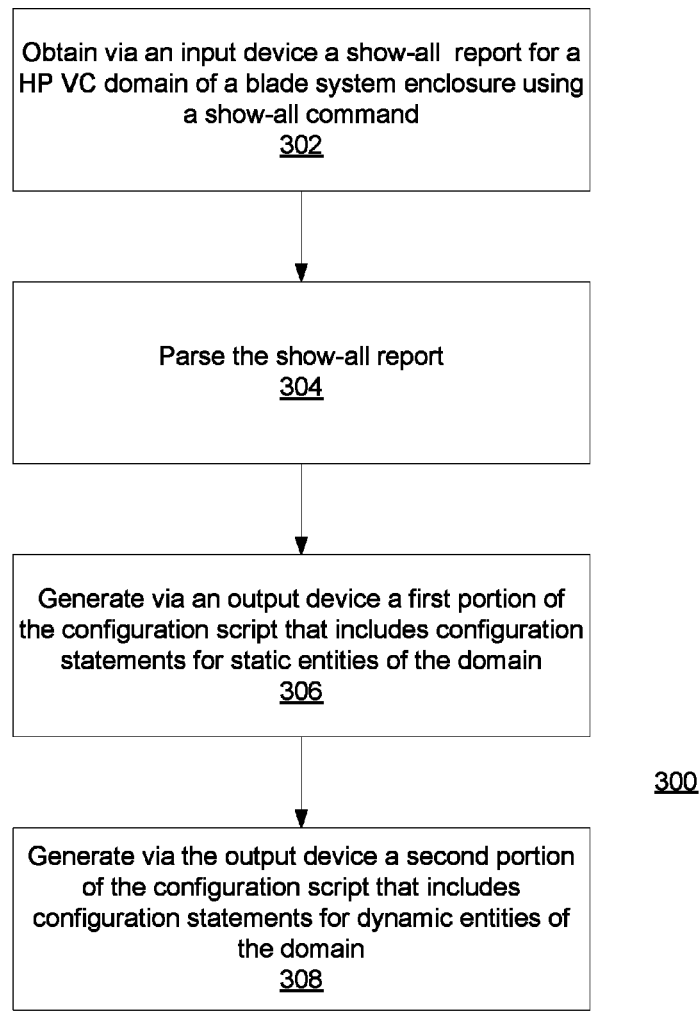
FIG. 3A illustrates a method for restoring a configuration script, according to some embodiments of the present invention.

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

Blades are a form of server technology that have a more efficient design than conventional servers, cutting down on the excess components that are usually found in regular servers and making room for the implementation of components that will help with the specified needs. This helps create more efficient use of physical space and energy.

Blades are packaged ultra-high density components that can be used toward a variety of services. The common uses include servers, storage of data, and communication interfaces. Blades are racked inside blade enclosures, which supply them with power, cooling and networking.

The Blade System forms part of the Hewlett Packard (HP) Converged Systems, which use a common Converged Infrastructure architecture for server, storage, and networking products. Designed for enterprise installations of 100 to more than 1,000 Virtual machines, the HP ConvergedSystem 700, for example, is configured with BladeSystem servers. When managing a software-defined data center, a System administrator can perform automated lifecycle management for BladeSystems using HP OneView for converged infrastructure management.

A Blade System enclosure typically includes some 1 to 8 VC interconnected modules. A cluster of enclosures (e.g., 1 to 4) with VC modules may be configured as a single logical unit. A blade is essentially a self-contained server, which collectively fits into an enclosure with other blades. A blade server is a stripped down server computer with a modular design optimized to minimize the use of physical space and energy. Whereas a standard rack-mount server requires at least a power cord and network cable, blade servers have many components removed to save space, minimize power consumption and other considerations, while still having all the functional components to be considered a computer. A blade enclosure, which can hold multiple blade servers, provides services such as power, cooling, networking, various interconnects and management. Together, blades and the blade enclosure form a blade system (BladeSystem from Hewlett-Packard is a specific product name). Different blade providers have differing principles regarding what to include in the blade itself, and in the blade system altogether. In a standard server-rack configuration, one rack unit or 1 U—19 inches (480 mm) wide and 1.75 inches (44 mm) tall—defines the minimum possible size of any equipment. The principal benefit and justification of blade computing relates to lifting this restriction to reduce size requirements. The most common computer rack form-factor is 42 U high, which limits the number of discrete computer devices directly mountable in a rack to 42 components. Blades do not have this limitation. As of 2009, densities of up to 128 discrete servers per rack are achievable with blade systems The enclosure (sometimes referred to as "chassis") provides power, cooling, connectivity and management to each blade server. The blade servers themselves contain only core processing elements, making them hot-swappable.

In HP's VC technology, fixed blade server adapter network addresses are de-couples from the associated external networks so that changes in the blade server infrastructure and the Local Area Network (LAN) and Storage Area Network (SAN) environments do not require a complex engagement between server, LAN, and SAN teams for every task. Using a built-in HP Virtual Connect Manager for small configurations or the HP Virtual Connect Enterprise Manager for larger environments, administrators can define a server connection profile for each blade server bay before a server is installed. A VC server profile is a logical grouping of attributes related to that server's connectivity, that may be assigned to a blade server and to units connected to it. This profile defines Media Access Control (MAC) addresses for all network interface controllers (NICs), Preboot Execution Environment (PXE) enablement, World Wide Names (WWNs) for all host bus adapters (HBAs), and Fiber Channel SAN boot parameters along with their associated network uplink connections, further associating them to a blade server bay so that even if the server is changed, the configuration and connection profile stay the same. When a new server replaces or otherwise reconfigures the previous server, the same profile is associated and used by the new server.

When using the HP Onboard Administrator to manage c-Class Blade Enclosures, it possible to generate a "show config" report in plain text format that lists the configuration of the enclosure and the whole inventory, including device bays, interconnect modules, MAC, WWN's etc. The "show config" report can be very useful for troubleshooting purposes and is in many instances the first item checked by HP experts when addressing system problems. The "show config" report may provide executable script for the VC domain configuration though it may not provide information to restore identifiers.

However, the "show config" report does not include information on assignments of similar identifiers. An identifier is uniquely identifying hardware objects, such as, for example, FC World Wide Name (WWN), Ethernet Hardware Address (MAC), server serial number (S/N). In VC environments, each identifier may either be factory set (default) or logically assigned by the Domain. Each identifier is assigned sequentially from a predefined pool of assignments on first profile to server assignment. Over time, this may create leaps and gaps in identifier sequences, as configuration changes occur in source domain.

It is therefore, an object of some embodiments of the present invention to provide a method and system for restoring an HP VC domain configuration script (hereinafter, for brevity, referred to as—"configuration script") that fully resembles existing VC domain, including assignments of similar identifiers, given similar hardware configuration.

"Restoring" or "generating", in the context of the present specification, does not necessarily mean actually restoring the original configuration script that was used when the VC domain was first initiated. Rather it may mean generating a configuration script that has configuration information complying with the current configuration of the VC domain, and includes information relating to previous configuration changes.

A method for restoring a configuration script, according to some embodiments of the present invention, is an automated, computer-based method.

Other objects and advantages of some embodiments of the present invention would become apparent from the present specification.

A method for restoring a configuration script for an HP VC domain, according to some embodiments of the present invention may include obtaining a "show all *" report and using it as input—this is a report in a high-level language (human readable). The method may also include parsing the input (the "show all" report) and storing the parsed input in an object data model form, representing VC configuration. The method may further include extracting static configuration entities (that remain constant over time) and reservation of connections that are implicit but that are not included in a coded instruction, such as domain, enclosures, networks, fabrics, and shared uplink sets. The method may also include extracting dynamic configuration entities (e.g., entities that may change over time), such as profiles, Ethernet connections (relating to MAC assignments), Fibre Channel over Ethernet—FCoE (relating to MAC and WWN assignments), Fabric connections (relating to WWN assignments), profile assignments (relating to serial number assignments).

According to some embodiments of the present invention, when parsing the input, information relating to for example the following portions or sections may be analyzed, obtained or retrieved:
a. Domain information;
b. Enclosure information;
c. Ethernet connections information;
d. Fabric information;
e. FCoE connection information;
f. Firmware information;
g. Interconnect information;
h. Loop-protect information;
i. NAG—Network Auralization for GnutellaNetwork information;
j. Network information;
k. Network access group information;
l. Profile information;
m. Server information;
n. Server port information;
o. Server port map information;
p. Server identity (ID) information;
q. Stacking link information;
r. Status information;
s. Uplink port information;
t. Uplink set information.

Other or different information may be obtained. Each section may be parsed in a form respective of its format (e.g., plain text, name-value, table, repeated name-value sections, repeated tables, composite section of name-value and table).

Then, according to some embodiments of the present invention, a data model may be built based on information from the parsed sections.

Based on the extracted static configuration entities, an explicit static port configuration coding or script may be generated. The restored configuration script may include generation commands for domain, enclosures, networks, fabrics and shared uplink sets. Values from the data model which relate to the static entities (not affected by order) may be extracted and presented in the static configuration script.

Generating the dynamic configuration entities in the restored configuration script involves including statements in the restored configuration script that affect assignment of identifiers on actual hardware. This may include generating an unordered set of actual profile creation commands that include, for example, Ethernet, FCoE and Fabric connections.

Then, the profile creation commands may be ordered based on the parsed information, from MAC, WWN and S/N information.

Gaps in the ordered profile creation commands, which may be derived from disorder in the order of the MAC, WWN and S/N sequence, may then be determined.

According to some embodiments of the present invention, a set of dummy or filler profiles is added to the configuration script to fill the determined gaps in the ordered profile creation commands.

For each sequence of MAC, WWN and/or S/N (undisrupted order of the original identifiers), reserve_idenfifiers procedure may be called or executed for dummy or filler profiles to fill the gap preceding that sequence, and then reserve_identifiers procedure is called again, for actual profiles of that sequence. Then a delete statement is added for each dummy profile. Finally, an assignment statement is added for each actual profile.

A reserve_identifiers procedure may include for example:
a. find, for each dummy profile, a Blade server (hardware item), that respective to a given profile such server ought to exist or have existed, for at a certain time in the past the gap was in fact non-existent and server was assigned a real profile (that was later deleted or otherwise cancelled);
b. add an assignment statement for each dummy or filler profile (this allocates identifier/s);
c. add an unassignment statement for each dummy statement, releasing the server for future reassignment, and reserving the identifiers that were previously associated with that server.

FIG. 1 shows an excerpt from a "show all" report of an HP VC Blade System enclosure. A "Show All" command may for example provide one or more scripts for the configurations of a Blade enclosure's current inventory. Shown is a part of the report titled Devicebay Information, which includes information on current profile assignments in the VC domain of a Blade System enclosure named "enclosure 1". The report is provided as a non-limiting example only and shows that:

Device HP ProLiant BL420c Gen8 (ID enc0:1), associated with Bay 1, is assigned Profile_1;

Device HP ProLiant BL460c Gen8 (ID enc0:2), associated with Bay 2—Profile is indicated as unassigned;

HP ProLiant BL490c G7 (ID enc0:3), associated with Bay 1, is assigned Profile_3;

The remaining entities—HP ProLiant BL465c Gen8, HP ProLiant BL685c G7 and HP ProLiant BL620c G7 are unassigned.

It is not clear from this report that there is a gap between Profile_1 and Profile_3, but there is no indication to which device was assigned Profile_2, and whether the other devices were ever assigned profiles.

Applying a method for restoring a configuration script for that enclosure (enclosure 1), according to some embodiments of the present invention, yields the generation of a configuration script that is presented in FIG. 2.

FIG. 3A illustrates a method 300 for restoring a configuration script, according to some embodiments of the present invention.

Method 300 includes obtaining 302 via an input device a show-config report for a HP VC domain of a blade system enclosure using a show-all command. Method 300 may also include parsing 304 the show-all report. Method 300 may further include generating 306 via an output device a first portion of the configuration script that includes configuration statements for static entities of the domain; and generating 308 via the output device a second portion of the configuration script that includes configuration statements for dynamic entities of the domain.

Figure 3B:
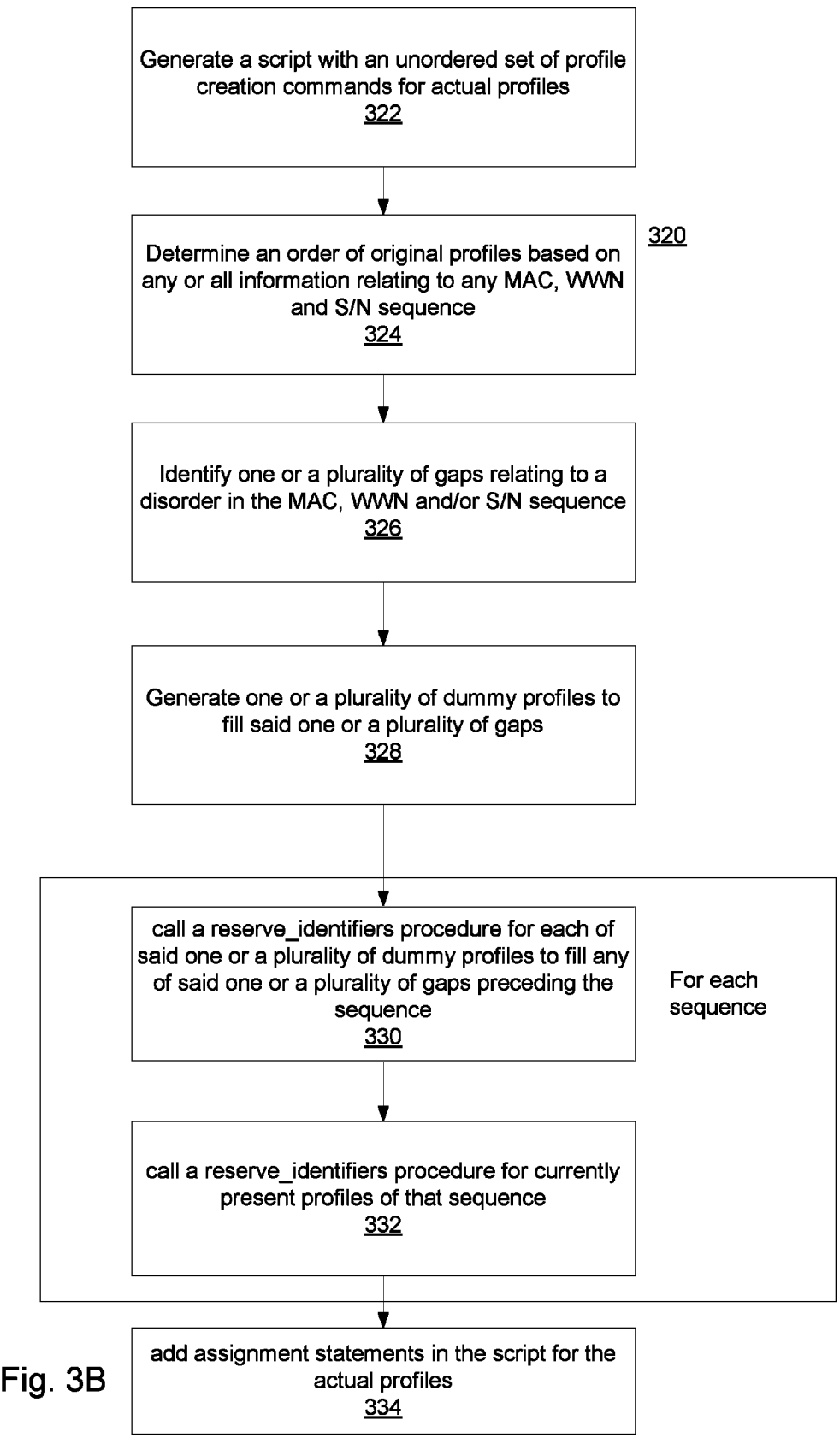
FIG. 3B illustrates a method for generating a second portion of the configuration script that includes configuration statements for dynamic entities of the domain, according to some embodiments of the present invention.

FIG. 3B illustrates a method 320 for generating a second portion of the configuration script that includes configuration statements for dynamic entities of the domain, according to some embodiments of the present invention.

Method 320 may include generating 322 a script with an unordered set of profile creation commands for actual profiles. Method 320 may also include determining 324 an order of original profiles based on any or all information relating to any MAC, WWN and S/N sequence. Method 320 may further include identifying 326 one or a plurality of gaps relating to a disorder in the MAC, WWN and/or S/N sequence. Method 320 may further still include generating 328 one or a plurality of dummy profiles to fill said one or a plurality of gaps. Method 320 may also include, for each sequence, calling 330 a reserve_identifiers procedure for each of said one or a plurality of dummy profiles to fill any of said one or a plurality of gaps preceding the sequence, and calling 332 a reserve_identifiers procedure for currently present profiles of that sequence. Method 320 may also include adding 334 assignment statements in the script for the actual profiles.

In some embodiments, inputs may be included from two or more configurations, and scripts may be generated for the various configurations. In some embodiments dummy configurations may be erased at or near an end of a script generation process. In some embodiments, a script may be generated for one or just some of the profiles in a configuration. In some embodiments a script or set of scripts may be generated on for example a daily or periodic basis, and another script may be generated at a subsequent time, so that a difference between the configurations at the two times may be generated or deducted and a record may be created of the scripting actions that were performed between the periods.

Figure 4:
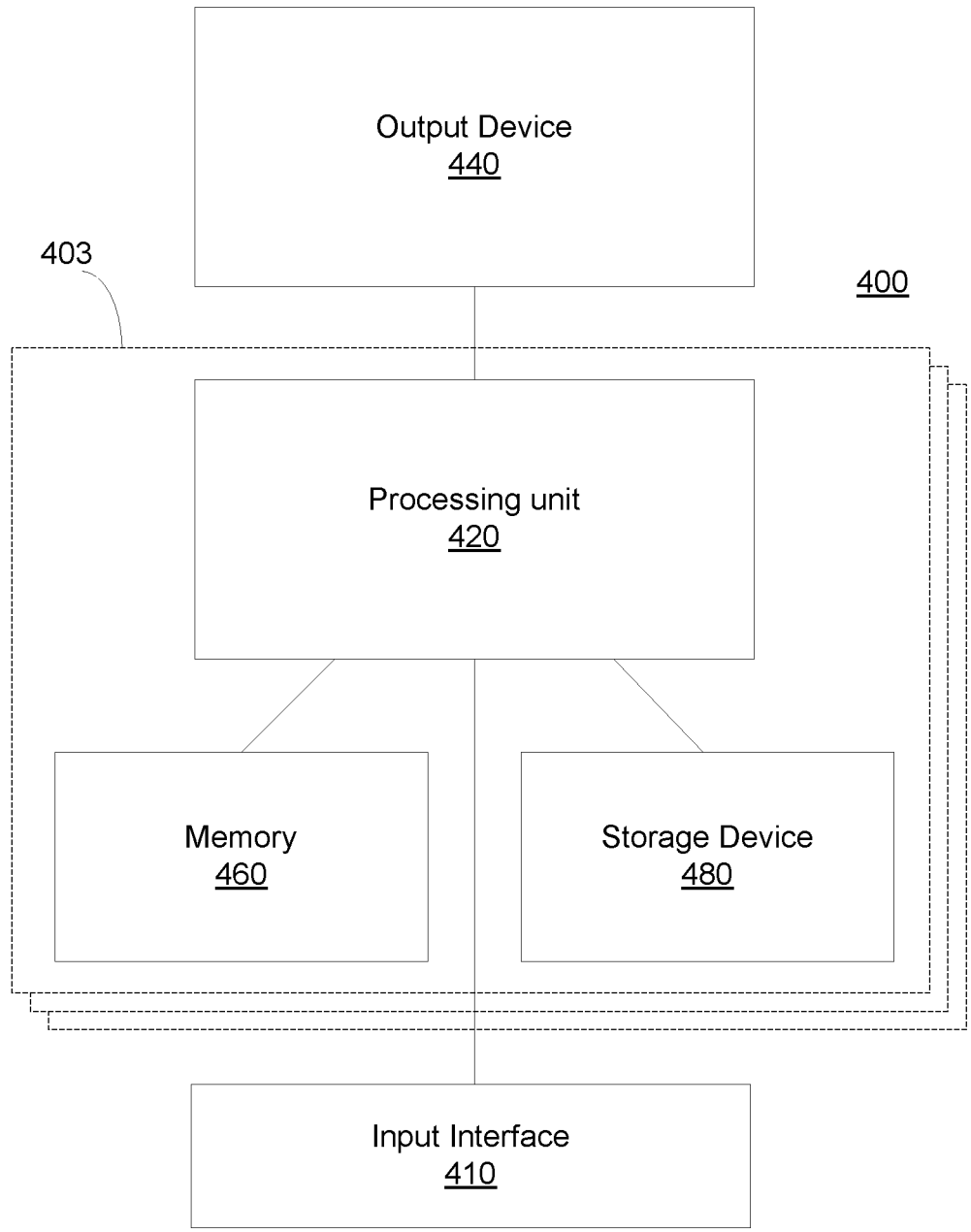
FIG. 4 is a schematic diagram of a system in accordance with an embodiment of the invention.

FIG. 4 illustrates a system 400 for restoring a configuration script, according to some embodiments of the present invention.

System 400 may include a blade 403 that includes processing unit 420 (e.g. one or a plurality of computer processors, on a single machine or distributed on a plurality of machines) for executing a method according to some embodiments of the present invention. Processing unit 420 may be linked with memory 460 on which a program implementing a method according to some embodiments of the present invention and corresponding data may be loaded and run from, and storage device 480, which includes a non-transitory computer readable medium (or mediums) such as, for example, one or a plurality of hard disks, flash memory devices, etc. on which a program implementing a method according to some embodiments of the present invention and corresponding data may be stored. System 400 may further include an output device 440 (e.g. display device such as CRT (cathode ray tube), LCD (liquid crystal display), LED (light emitting diode) etc.) on which one or a plurality user interfaces associated with a program implementing a method according to some embodiments and corresponding data may be presented. System 400 may also include input device 410, such as, for example, one or a plurality of keyboards, pointing devices, touch sensitive surfaces (e.g. touch sensitive screens), etc. for allowing a user to input commands and data. Processing unit 420 may be configured to perform methods according to embodiments of the present invention by for example executing code or software stored for example in memory 460.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

What is claimed is:

1. A method for generating a configuration script of a Hewlett Packard Virtual Connect domain of a Blade System enclosure, the method comprising:
   obtaining via an input device a show-all report for a Hewlett Packard Virtual Connect domain of a blade system enclosure using a show-all command;
   parsing the show-all report;
   generating via an output device a first portion of the configuration script that includes configuration statements for static entities of the domain;
   generating via the output device a second portion of the configuration script that includes configuration statements for dynamic entities of the domain, wherein generating the second portion comprises:
      generating a script with an unordered set of profile creation commands for actual profiles;
      determining an order of original profiles based on any or all information relating to any Media Access Control (MAC), World Wide Name (WWN) and serial number (S/N) sequence;
      identifying one or a plurality of gaps relating to a disorder in the MAC, WWN and/or S/N sequence; and
      generating one or a plurality of dummy profiles to fill said one or a plurality of gaps; and
   for each sequence, calling a reserve-identifiers procedure for each of said one or a plurality of dummy profiles to fill any of said one or a plurality of gaps preceding the sequence, and calling the reserve-identifiers procedure for currently present profiles of that sequence.

2. The method of claim 1, further comprising adding assignment statements in the script for the actual profiles.

3. A non-transitory computer readable storage medium for restoring a configuration script of a Hewlett Packard Virtual Connect domain of a Blade System enclosure, having stored thereon instructions that when executed by a processor will cause the processor to:
   obtain via an input device a show-all report for a Hewlett Packard Virtual Connect domain of a blade system enclosure using a show-all command;
   parse the show-all report;
   generate via an output device a first portion of the configuration script that includes configuration statements for static entities of the domain; and
   generate via the output device a second portion of the configuration script that includes configuration statements for dynamic entities of the domain, wherein generating the second portion comprises:
      generating a script with an unordered set of profile creation commands for actual profiles;
      determining an order of original profiles based on any or all information relating to any Media Access Control (MAC), World Wide Name (WWN) and serial number (S/N) sequence;
      identifying one or a plurality of gaps relating to a disorder in the MAC, WWN and/or S/N sequence; and
      generating one or a plurality of dummy profiles to fill said one or a plurality of gaps; and
   for each sequence, call a reserve identifiers procedure for each of said one or a plurality of dummy profiles to fill any of said one or a plurality of gaps preceding the sequence, and calling the reserve identifiers procedure for currently present profiles of that sequence.

4. The non-transitory computer readable storage medium of claim 3, having stored thereon instructions that when executed by a processor will cause the processor further to add assignment statements in the script for the actual profiles.

5. A system for restoring a configuration script of a Hewlett Packard Virtual Connect domain of a Blade System enclosure, the system comprising:
   memory; and
   a processing unit configured to:
      obtain via an input device a show-all report for a Hewlett Packard Virtual Connect domain of a blade system enclosure using a show-config command;
      parse the show-all report;
      generate via an output device a first portion of the configuration script that includes configuration statements for static entities of the domain;
      generate via the output device a second portion of the configuration script that includes configuration statements for dynamic entities of the domain, wherein generating the second portion comprises:
         generating a script with an unordered set of profile creation commands for actual profiles;
         determining an order of original profiles based on any or all information relating to any Media Access Control (MAC), World Wide Name (WWN) and serial number (S/N) sequence;
         identifying one or a plurality of gaps relating to a disorder in the MAC, WWN and/or S/N sequence; and
         generating one or a plurality of dummy profiles to fill said one or a plurality of gaps; and
      for each sequence, call a reserve identifiers procedure for each of said one or a plurality of dummy profiles to fill any of said one or a plurality of as preceding the sequence, and calling the reserve identifiers procedure for currently present profiles of that sequence.

6. The system of claim 5, wherein the processing unit is further configured to add assignment statements in the script for the actual profiles.

* * * * *